United States Patent [19]

Browning

[11] Patent Number: 4,545,324
[45] Date of Patent: Oct. 8, 1985

[54] POWDER SPRAY BOOTH AND INTERCHANGEABLE COLLECTORS

[76] Inventor: Jess Browning, 4217 Via Pinzon, Palos Verdes Estates, Calif. 90210

[21] Appl. No.: 608,496

[22] Filed: May 9, 1984

[51] Int. Cl.$^4$ .................. B01D 46/04; B05B 15/04
[52] U.S. Cl. .................. 118/634; 118/309; 118/326; 118/DIG. 7; 98/115.2
[58] Field of Search ......... 118/634, 309, 326, DIG. 7; 98/115 SB

[56] References Cited

U.S. PATENT DOCUMENTS 4,277,260 7/1981 Browning ..................... 118/326

Primary Examiner—Richard Bueker
Attorney, Agent, or Firm—Blakely, Sokoloff, Taylor & Zafman

[57] ABSTRACT

A powder spray booth for use in the electrostatic coating of articles is disclosed. The spray booth is of a basically symmetrical configuration allowing the spray coating of articles passing therethrough on a conveyor from either side thereof. At each end of the spray booth and positioned at a lower elevation than the spray region is an exhaust blower which may be effectively coupled to a powder cart located therebetween and below the spray region for the automatic recovery of the overspray. The powder carts are portable and when in a cooperative position with respect to the spray booth, include self-cleaning filters and automatic recovery and recirculation of the overspray. A plurality of powder carts may be used to form a sort of magazine to provide very fast color change capability. The spray booth itself may also be mounted on rail-like members so as to readily movable between different positions in a conveyor line or different conveyor lines according to the needs at the particular time. Various other aspects of the invention are disclosed.

13 Claims, 9 Drawing Figures

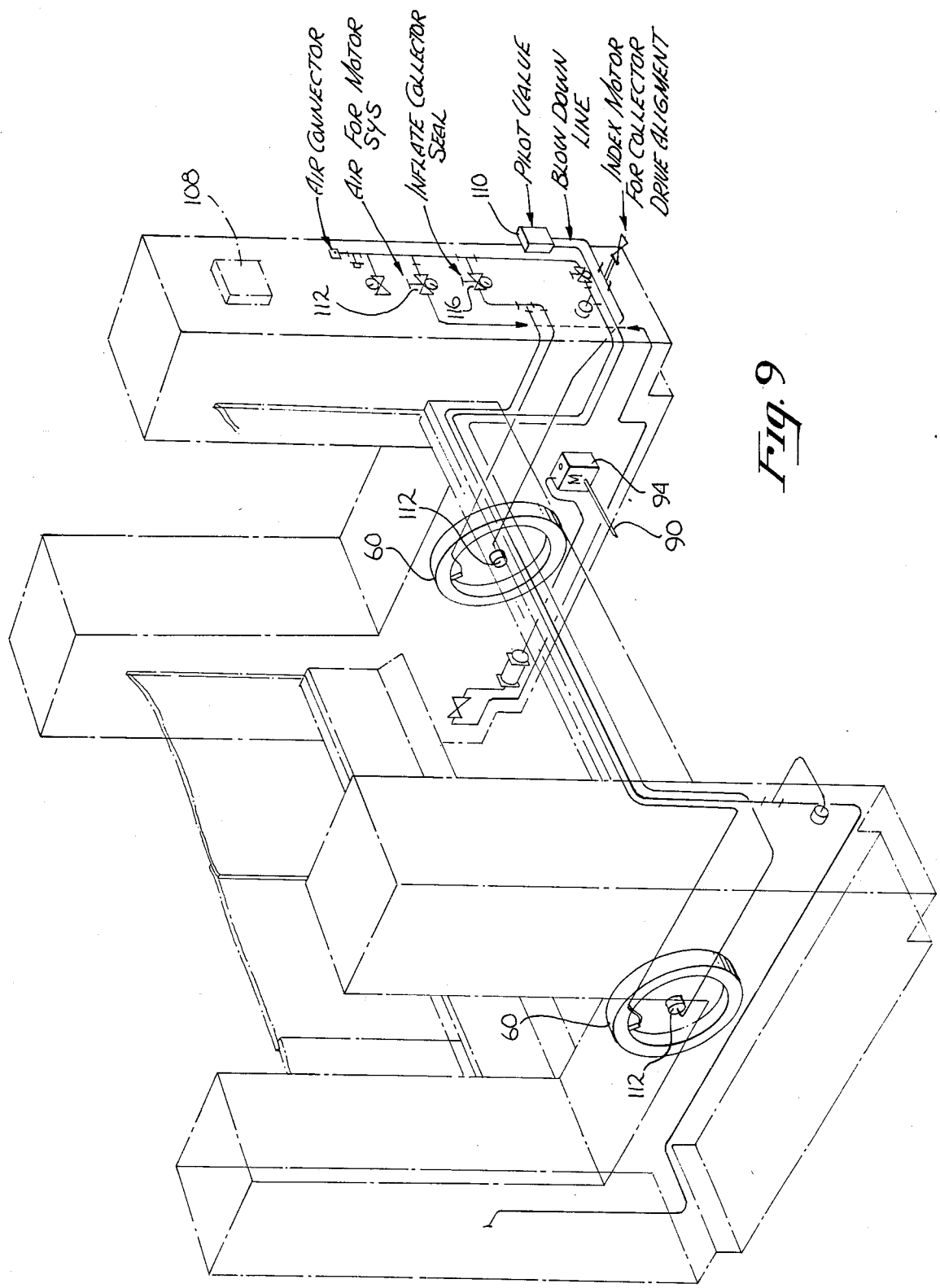

image# POWDER SPRAY BOOTH AND INTERCHANGEABLE COLLECTORS

BACKGROUND OF THE INVENTION

1. Field of the Invention.

The present invention relates to the field of electrostatic powder spray coating systems.

2. Prior Art.

For many manufactured goods it is necessary to paint one or more surfaces thereof so as to provide a decorative and/or protective coating to the surface. Conventional paints however, are not easy to apply on a production basis as lack of accurate control of the coating thickness may result in runs or inadequate coating of the article being painted. This is particularly true of parts having complex shapes, which encourage uneven coating thicknesses. Further, the commonly used paint solvents necessary to allow proper spraying of the paint are expensive and do not add to the coating, present a fire hazard, and particularly, in recent years, are highly restricted because of environmental considerations. Further, solvent base paints generally require some time at temperature for the proper curing thereof, a definite manufacturing disadvantage. Even if the time element could be eliminated, the efficiency of the spray painting process is less than optimum because of the substantial over-spray often encountered, depending in part on the experience of the painter and the shape of the part being painted.

Processes for coating parts with a solid resin coating provide other decorative and/or protective coating techniques, and have found ever increasing application in recent years because of their many advantages over ordinary solvent base paints. In accordance with these processes, the resin coating is prepared in a powder form and sprayed on the parts to be coated much like a liquid paint. The parts however, are generally connected to one electrode of a direct current power supply, with an electrode of opposite polarity being provided at the orifice of the spray gun so that the part to be coated and the spray are given opposite charges. This results in electrostatic attraction between the powder and the parts to attract the powder to the surface of the part and keep it temporarily clinging thereto. Typically, as the powder builds up on the part, the electric charge on the part is offset by the opposite charge of the powder so that when a powder coating of the desired thickness is achieved, the electrostatic attraction is reduced to zero, thereby allowing additional powder to merely fall off the part. This self-limiting characteristic of the powder makes it much easier to cover hard to get at areas without overcoating adjacent areas. Since the resin will melt at an elevated temperature to provide the desired coating, such processes generally have the advantage of not requiring substantial time at temperature, thereby minimizing the "curing" equipment requirements.

The resin powder (hereinafter referred to simply as "powder") is generally sprayed in a powder spray booth provided for this purpose, with the parts to be coated being hung on a conveyor so as to pass through the spray booth at an appropriate speed. Such spray booths are generally provided with some form of collection or filtering system, whereby the overspray and excess powder falling off of the parts may be collected for reuse and/or to avoid environmental contamination. For this purpose, an air flow system is generally provided whereby air (and powder) are withdrawn from the spray booth area into a plenum wherein much of the powder will settle out. The remaining powder is generally filtered out of the air stream by appropriate filters provided for this purpose. Generally, the powder that settles out of the air is recycled, depending upon the specific design of the equipment.

Various types of filters have been used in the prior art. By way of example, bag type filters have been commonly used in such equipment, such filters generally comprising long, small diameter filter bags over appropriate filter tubes, with an appropriate fan withdrawing air from the center of the filter tubes so as to cause a flow generally directed inward through the filter tubes so that the dust filtered out collects on the outer surface of the tubes. It is also known in such equipment to occasionally provide a pulse of air in a reverse flow direction through the filters to essentially blow the filters clean, whereby much of the powder blown therefrom will settle out for recycling. Generally speaking, fluidized beds may be used to fluidize the powder which has settled out for recycling. Such fluidized beds generally have a porous floor member, which allows the injection of air into the powder to essentially expand the powder and allow the particles thereof the flow over each other, thereby resulting in flow characteristics much like ordinary fluids.

The foregoing equipment performs well in a ordinary production environment wherein only a single color is to be applied, or at least in situations wherein color changes are at most infrequent. However, in instances wherein frequent color changes are required, substantial down time may result. In particular, at least in the type of equipment utilizing periodic blow down to clean the filter bags, the filter bags cannot be cleaned well enough to allow the change of color without changing the filter bags also. This, coupled with the fact that prior art equipment of this type normally has the filter, mounting structure, etc. fastened to the spray booth itself, makes color changing a messy and time-consuming operation. In the inventor's earlier U.S. Pat. No. 4,277,260, powder collectors are disclosed which, in substantial part, overcome some of these problems by utilizing cartridge filters having a blow down capability and a detachable powder cart to more readily facilitate the change of powder colors by the change of the carts. The present invention however, represents an improvement in the powder collectors of the earlier patent to even more readily facilitate powder color changes to provide a more flexible spray booth and to provide for transportability of the entire system to different positions within a manufacturing plant.

SUMMARY OF THE INVENTION

A powder spray booth for use in the electrostatic coating of articles is disclosed. The spray booth is of a basically symmetrical configuration allowing the spray coating of articles passing therethrough on a conveyor from either side thereof. At each end of the spray booth and positioned at a lower elevation than the spray region is an exhaust blower which may be effectively coupled to a powder cart located therebetween and below the spray region for the automatic recovery of the overspray. The powder carts are portable and when in a cooperative position with respect to the spray booth, include self-cleaning filters and automatic recovery and recirculation of the overspray. A plurality of powder carts may be used to form a sort of magazine to provide very fast color change capability. The spray booth itself may also be mounted on rail-like members so as to readily movable between different positions in a conveyor line or different conveyor lines according to the needs at the particular time. Various other aspects of the invention are disclosed.

BRIEF DESCRIPTION OF THE DRAWINGS

FIG. 7 is a side view taken on an expanded scale and in partial cross section of the drive system between the air motor 94 and the cartridge filter rotating system in a cooperatively disposed powder cart.

FIG. 8 is a cross section of the drive system taken along line 8—8 of FIG. 7.

FIG. 9 is a schematic illustrating the various air lines, valves and other controls of the invention.

DETAILED DESCRIPTION OF THE INVENTION

Figure 1:
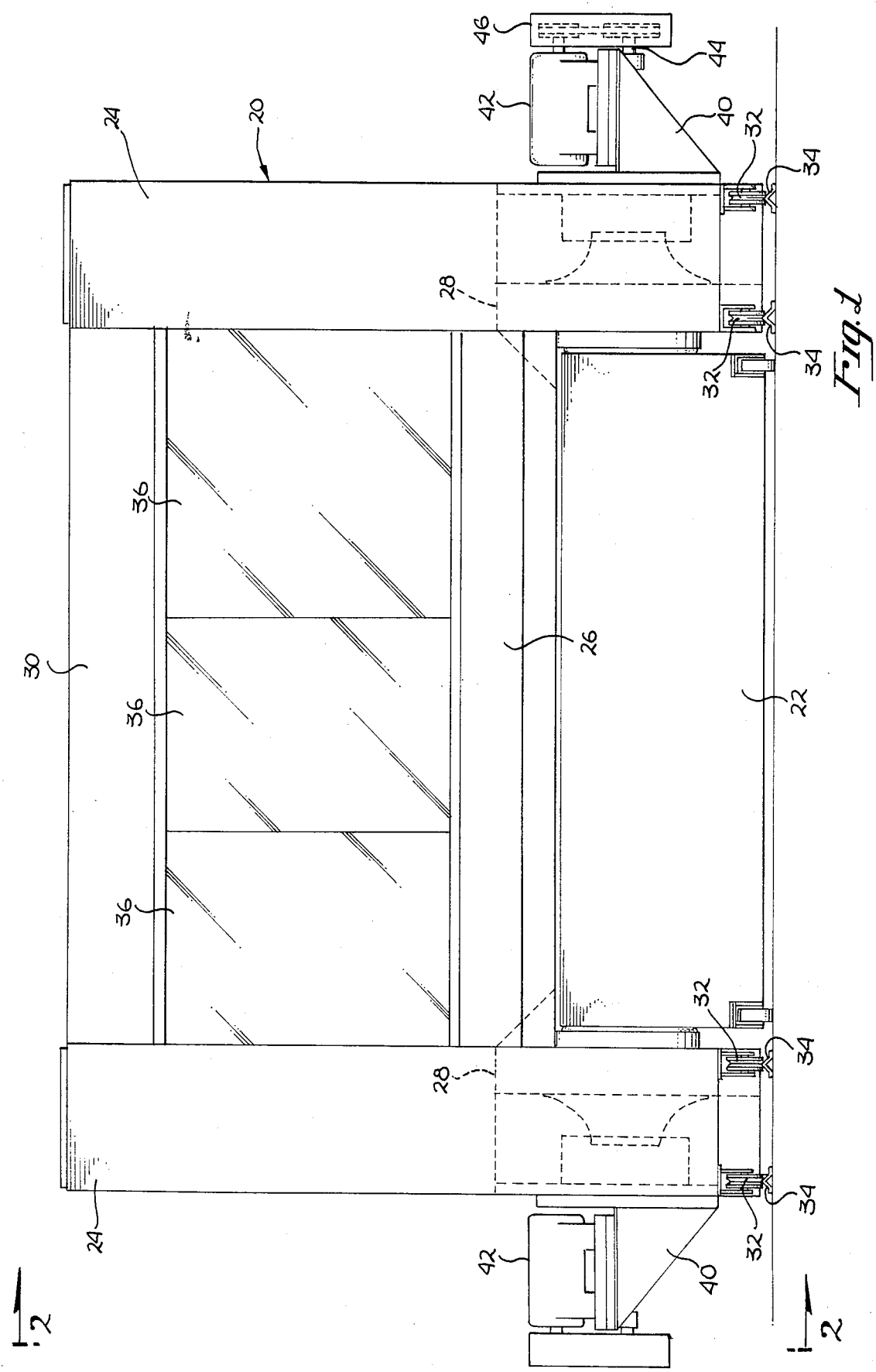
FIG. 1 is a side view of the preferred embodiment of the present invention.
Figure 2:
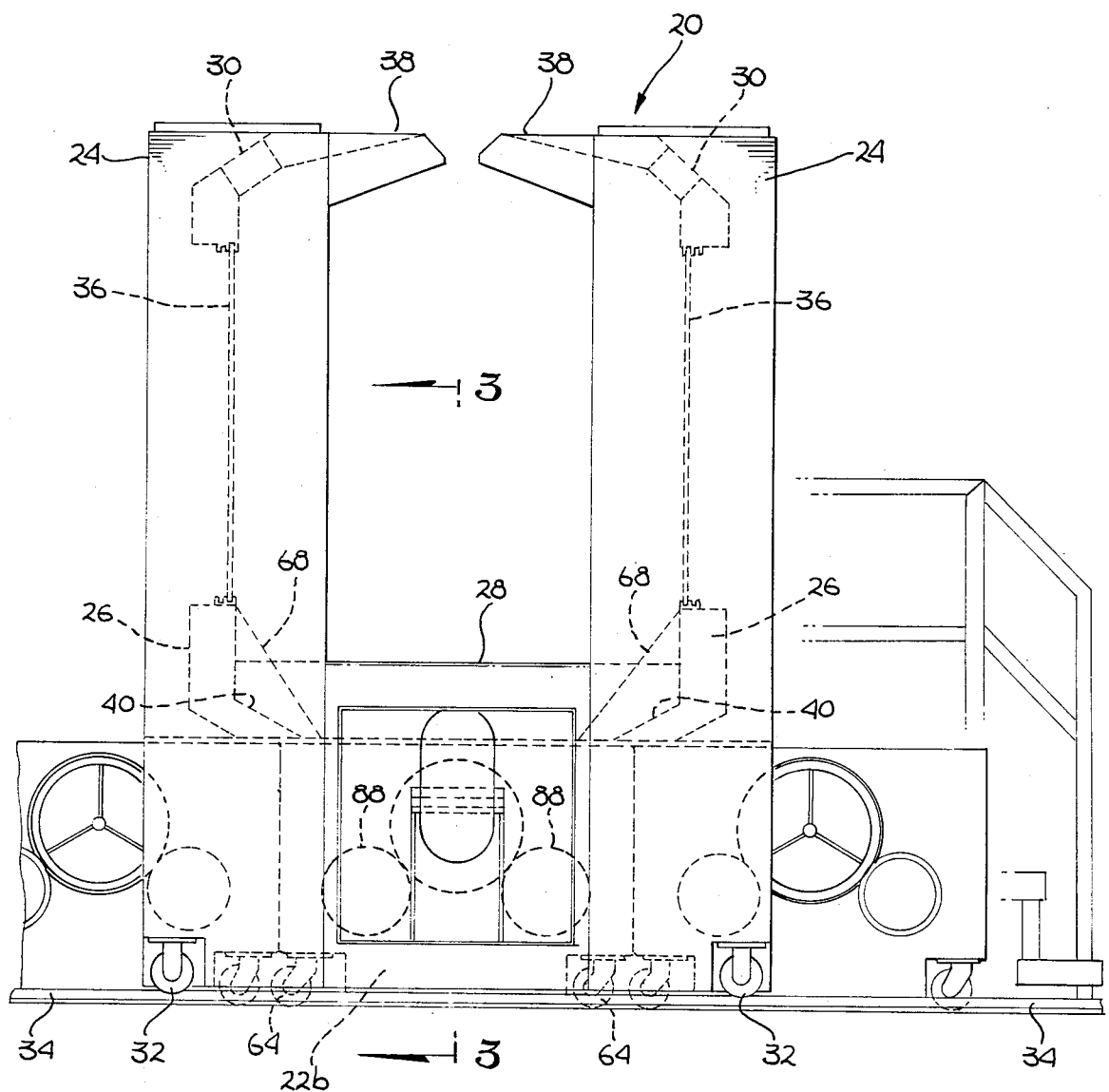
FIG. 2 is an end view of the embodiment of FIG. 1 taken along line 2—2.

First referring to FIGS. 1 and 2, a side view and an end view, respectively, of the preferred embodiment of the present invention, with various internal part or parts blocked from the respective view being shown in phantom, may be seen. The system shown is comprised of two primary cooperating subsystems, specifically the spray booth itself, generally indicated by the numeral 20, and a powder cart or powder carts 22 (three powder carts being shown in FIG. 2 and identified for purposes of greater specificity as carts 22a, 22b and 22c so as to allow specific references to each of the three subsequently herein). The spray booth 20 has a main structure comprising four hollow corner posts 24 fastened together by longitudinal structures 26 and transverse structures 28. As may be best seen from FIG. 2, the top of the spray booth 20 has a longitudinal separation or opening whereby parts to be coated may be hung by elongated hooks from an overhead conveyor so as to pass through the spray regions of the spray booth as desired. Vertical posts 24 however, are structurally coupled together adjacent the top thereof along the direction of the opening by structures 30 to provide a rigid and durable spray booth structure, with structures 30 preferably housing fluorescent fixtures for internal booth lighting.

As may be seen in FIGS. 1 and 2, the preferred embodiment is not designed to merely rest on the floor of a plant, but rather is provided with grooved wheels 32 for resting on and for being rollable along small rails 34, which in a typical installation would be fastened to the plant floor. The portability of the spray booth 20 provided by such mounting has great advantages in certain instances, as it allows the rolling of the entire spray booth to different positions on an overhead conveyor line or even between conveyor lines based upon the particular needs within the plant at the time.

The spray booth enclosure of the preferred embodiment also includes three sliding shatter proof glass panels 36 which slide in a pair of tracks to at least allow the opening of one full panel at any one time for access to the booth by the operator standing on an elevated platform, generally indicated by the numeral 39, having steps at one or both ends thereof and supported either on the booth support structure or on its own support at the ends thereof so as to allow the free passage of carts thereunder. At the top of the booth are projections 38 which help close the top of the booth, except to the extent that the longitudinal opening is required for the passag of the supports for the parts to be sprayed. At the bottom of the spray booth at a position above the powder cart is an expanded metal floor on which an operator may stand, but which will allow passage of the overspray therethrough, with the inner lower walls 40 being tapered to provide a funnel-like structure to direct the settling overspray into carts 22 thereunder, specifically cart 22b as shown in FIG. 2.

Centrally located at each end of the spray booth 20 is an outward extending support 40, each supporting a motor 42 driving a blower shaft 44 through a belt drive system 46. As may be also seen, and perhaps better seen in FIG. 3 which is a cross section taken along line 3—3 of FIG. 2, each blower shaft 44 drives a blower 46, with blowers 46 having the inlet ends thereof coupled to inlet bells 48 communicating with plenums 50 which of course, when the blowers are operating, are reduced air pressure plenums. The exhaust for blowers 46 may extend upward through respective one of the corner posts 24 for exhausting upward through an overhead exhaust system, or alternatively, may exhaust at floor level for secondary filtering or outdoor exhaust.

Figure 3:
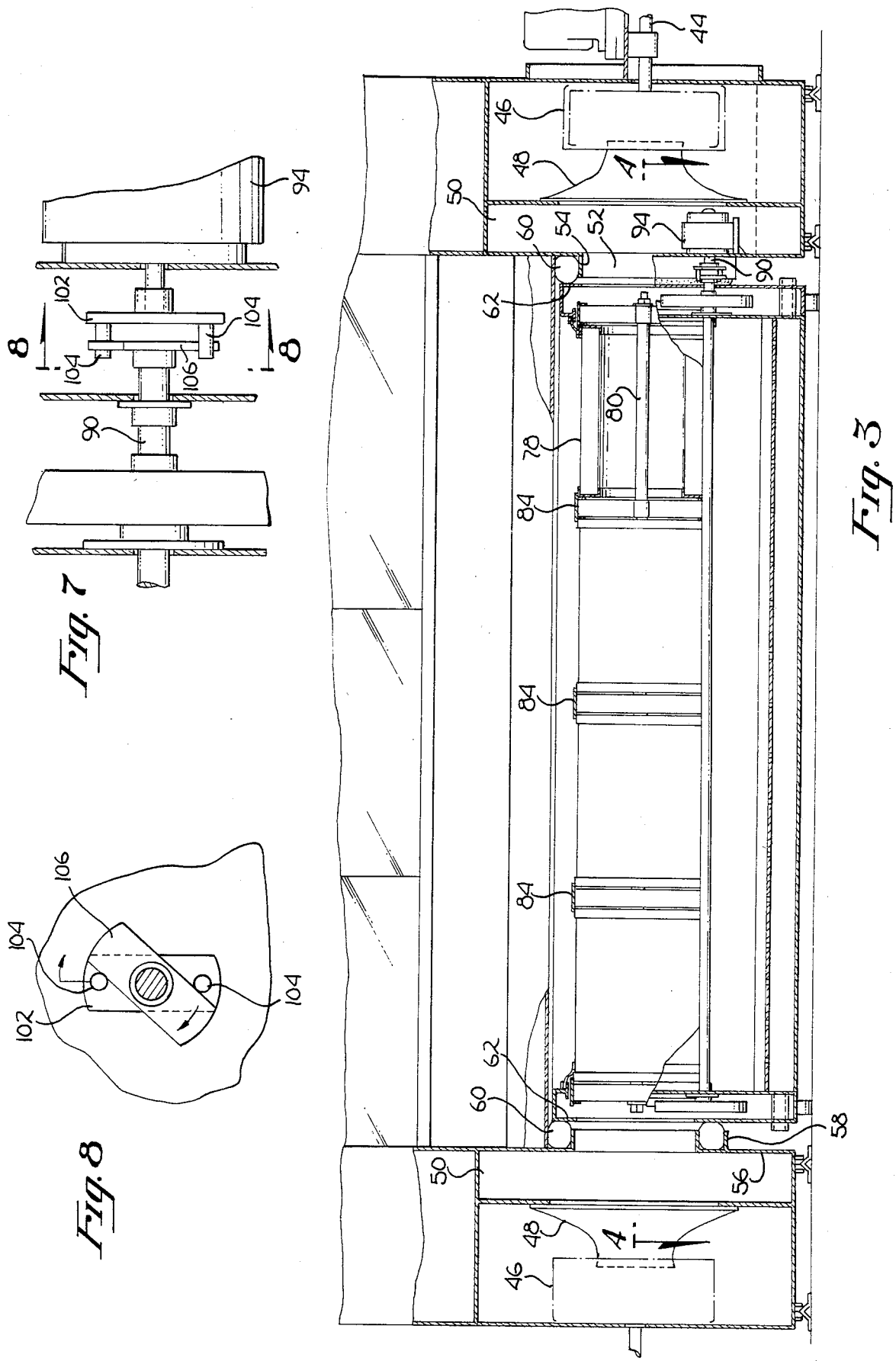
FIG. 3 is a partial cross sectional view taken along line 3—3 of FIG. 2.

Each plenum 50 has an opening 52 surrounded at its outer periphery by a short tubular member 54 welded to the wall 56 of the plenum 50 (see FIG. 3). A second larger diameter short tubular member 58, also welded to the wall 56, provides an annular recess for pneumatic member 60 which, as shall subsequently be seen, may be controllably inflated and deflated, the members expanding against walls 62 of the cart 22 when inflated. In the preferred embodiment, the pneumatic members 60 are conventional automobile tire inner tubes, well suited for this particular purpose.

Figure 4:
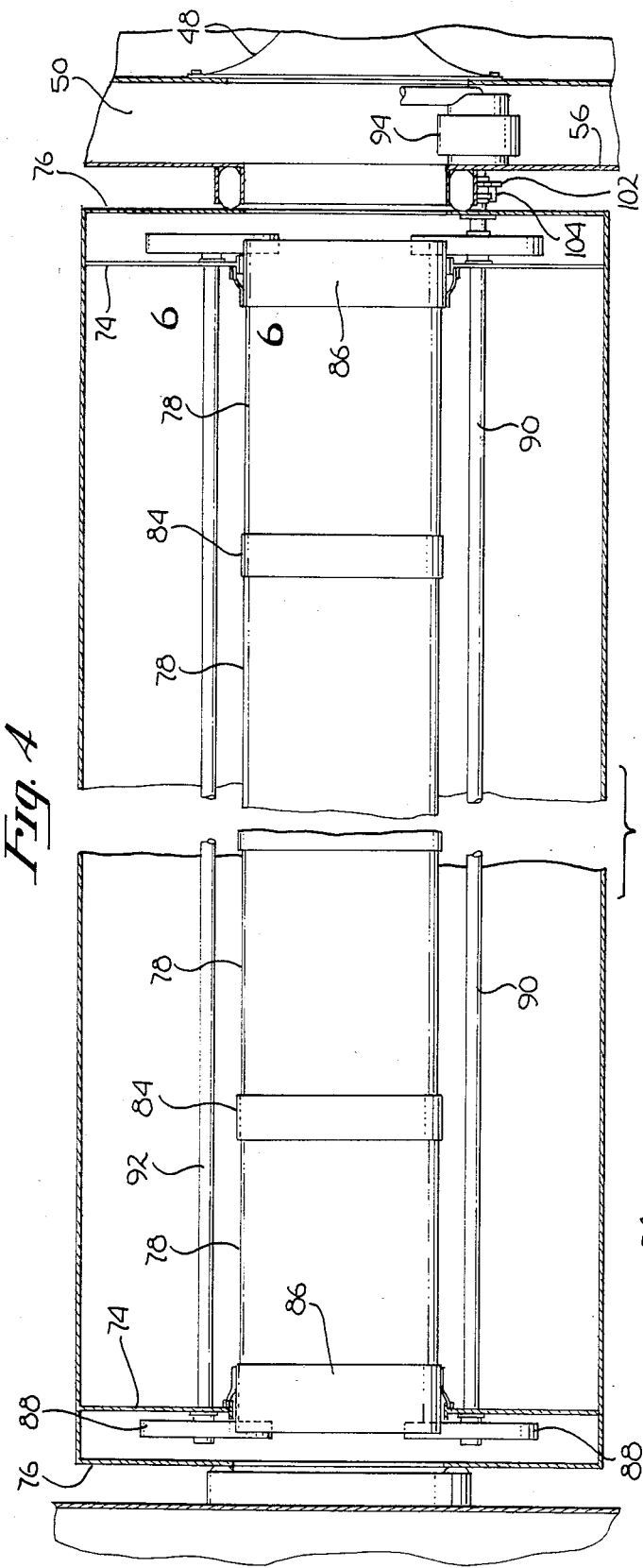
FIG. 4 is a partial cross sectional view taken along line 4—4 of FIG. 3.
Figure 5:
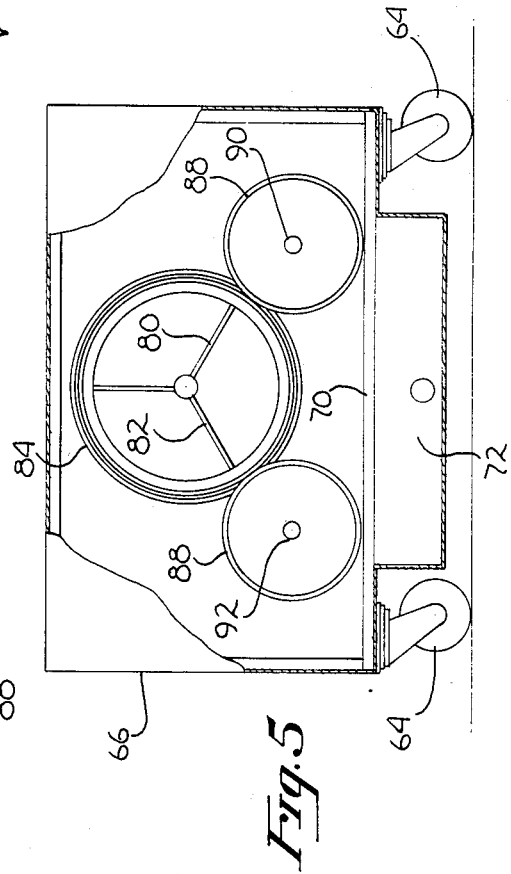
FIG. 5 is an end view taken in partial cross section of a typical powder collector cart.

Various details of the carts themselves may be seen in FIGS. 3, 4 and 5. Each cart is mounted on wheels or rollers 64, the carts being generally comprised of a rectangular enclosure 66, preferably having a pair of top panels 68 for closing off the top of the cart as a dirt barrier when not in use, and for opening when the cart is in position as shown in FIG. 2 so that the top panels 68 provide an even better funnel-like opening at the bottom of the spray booth. Preferably, the bottom 70 of each cart is comprised of a porous member, such as a porous plastic member, so that air provided to a floor plenum 72 will fluidize the powder in the cart for automatic recirculation to the spray gun. Adjacent each end of each cart is an interior end wall 74, each of the ends 76 as well as the interior end walls 74 having an opening therethrough for communication with plenums 50. Between the interior end walls 74 is a filter assembly comprising a plurality of cartridge filters 78 supported on a shaft 80 through a support structure 82 and coupled end to end by coupling members 84. While this assembly is relatively long, commercially available cartridge filters of this general type are relatively light and rigid so that minimal sag of the assembly occurs with only a nominal tension in shaft 80 to pull the stack of cartridges together. The outer spacers 86 provide the support for the assembly, these spacers riding on wheels 88 between the end walls 76 and inner end walls 74. the wheels 88 being supported on shafts 90 and 92. Shaft 90, as will be explained in greater detail, is rotatable by a drive motor 92 so that the entire horizontal stack of cartridge filters may be rotated as desired.

Figure 6:
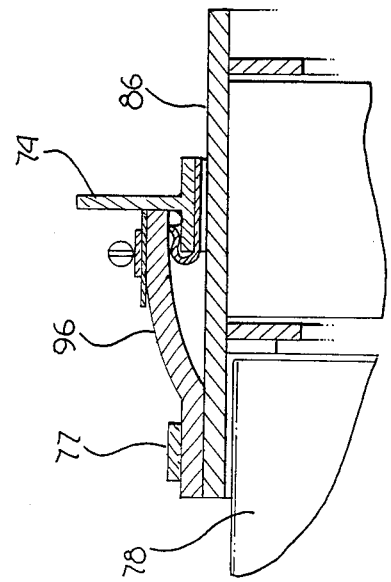
FIG. 6 is a cross section taken on an expanded scale along line 6—6 of FIG. 4.

At the end of each cartridge stack is a rotating seal, as may be best seen in FIG. 6. In particular, a flexible seal member 96 (felt in the preferred embodiment) is clamped to a circular member 73 welded to the inner end wall 74 by clamp 75, and rides on the outer surface of the respective end member 86 to provide a rotating vacuum seal. An elastic member 77 is used to retain the felt member on the sliding seal. Each cart also preferably has a sheet metal roof or hood 98 (See FIG. 5) to prevent direct impingement of the powder onto the top of the cartridge filters to prevent extraordinarily fast clogging in that region.

The air motor 94 may also be seen in FIG. 3, with details of the coupling between the air motor and shaft 90 of a cart in operating position under the spray booth being shown in FIGS. 7 and 8. Air motor 94 is mounted to wall 56 of the spray booth with the shaft 100 of the motor supporting a plate 102 having a pair of drive pins 104 thereon. These drive pins drive a second plate 106 connected to shaft 90 to provide the drive to rotate the stack of cartridge filters as desired. It may be seen from FIG. 8 that when plate 102 is in the vertical position, each cart may move horizontally in either the fore or aft direction, as plate 106 and shaft 90 will rotate somewhat to allow plate 106 to disengage itself from the pins 104. Similarly, another cart having the rotating filter assembly in a position such that the corresponding plate 106 is in a horizontal position may be rolled into position under the spray booth for engagement by pins 104 upon the subsequent rotation of the drive motor 94.

For purposes of clarity, various air lines, etc., have not been shown, though are illustrated schematically in FIG. 9. In general, certain of the elements of the system are controlled by a time clock 108. In particular, periodically time clock 108 pulses a pilot valve 110, which in turn imposes a strong blast of compressed air through ports 112 concentric with openings 52, the pulse of air extending into the then operative cart to provide a pulse of reverse flow air through the cartridge filters. In that regard, it has been found that while such a pulse will dislodge most of the powder from the filters, the powder at the top of the filters will tend to resettle in substantially the same position when the normal flow direction is reestablished, even with the cover 98 thereon. This, of course, is the reason for the structure which allows for the selective rotation of the filters about their axis so that no part of the filter is permanently directed upward. The rotation is achieved by a solenoid valve 112 periodically pulsed to provide a blast of compressed air to an accumulator 114 which provides a longer duration, lower pressure pulse to the motor 94 to rotate the filters. The pulse may be coincident with the blow down pulse if desired, though it is preferable to separate the two for the blow down and rotation are separate functions. Also, it should be noted that if desired, depending upon the supply of compressed air, etc., one may choose to isolate a left and right group of cartridge filters by putting an airflow barrier at the middle of the horizontal filter stack which will allow, among other things, the staggered blow down of the left and right sides. Thus the operating sequence selected by the appropriate setting of the time clock might be blow down the left side and blow down the right side then pulse the drive motor to angularly increment the cartridge stack, which three steps might occur, by way of example, over the period of a couple of minutes, being repeated every couple of minutes during the use of the equipment. The blow down of the entire stack at one time however, is also fully satisfactory in terms of operation of the system and satisfactory cleaning of the cartridge filters.

It should be noted that while it was previously stated that powder which collects at the top of the filter cartridges tends to only rise during blow down to resettle when normal filter flow is reestablished, it is not necessary that the cartridges be rotated 90 degrees or more on each incremental rotation. In fact, for wear and other considerations, it is preferable to rotate the filters through a much smaller angular increment on each pulse, a few degrees being appropriate, as the intended objective is met if the filter cartridges very slowly walk through a full rotation as opposed to being relatively permanently fixed in angular orientation.

Also shown in FIG. 9, is the valve 116 which typically would be manually controllable to inflate and deflate the seals 60 to accommodate the changing of operative powder carts and thus typically change of color. As previously stated, drive pins 104 (FIG. 8) should have a vertical orientation when such a change is being made whereas at any random time the pins will have a random orientation. Alignment to a vertical orientation may readily be made however, either by manually stepping the motor while watching the position of the pin or may be made automatically as schematically illustrated in FIG. 9. In particular, as shown in FIG. 9, the shaft of motor 94 may be provided with a double lobed cam 118 operating a switch 120 coupled through push button switch 122 to a solenoid valve 124 connected to the compressed air line so as to also be capable of supplying compressed air to the motor 94. Thus whenever a change in powder carts is desired, switch 122 may be pressed which will cause motor 94 to advance until the drive pins are vertical, at which time switch 120 will open to close valve 124. Also, as suggested in FIG. 2, carts 22a, 22b and 22c may be fastened to each other so as to in effect provide a powder cartridge comprising carts of multiple powder colors. By putting an appropriate drive means on that powder cartridge and by making valve 116 and switch 122 as well as the control of the drive means readily accessible to the spray gun operator, the operator of the spray booth has simply to use an air gun to clear the booth of any retained powder of one color, and change the powder cartridge position so as to bring a second color "on line". If separate spray guns were used for each color, purging of the spray guns themselves would not be required whereas if one spray gun were to be used for all colors, purging of various parts of the spray system itself would be required.

There has been described herein new and unique powder spray booth with interchangeable collectors having various advantages over prior art systems. One of the big advantages of the present invention is that interchangeable powder carts are used, with each powder cart having its own relatively inexpensive and self-cleaning filter system, compactly configured in a cart of relatively small size. The inclusion or association of the filter system with each cart as opposed to the spray booth has particular advantages when changing colors as filters are not readily sufficiently cleaned by blow down systems so as to allow immediate use with a new color without at least some visible contamination by the previous color. In that regard, blow down systems are really intended to prevent clogging to maintain a relatively high level of filter efficiency as opposed to the total cleaning of the filters. Obviously, while a preferred embodiment of the present invention has been disclosed and described herein, it will be understood by those skilled in the art that various changes in form and detail may be made therein without departing from the spirit and scope thereof.

I claim:

1. A powder spray booth for use in spraying articles hanging on a conveyor and passing therethrough comprising:

a support structure;
   a spray booth enclosure supported in an elevated position at opposite ends thereof by said support structure, said enclosure having first and second sides, a pair of end walls and a top, said end walls and said top having openings therein for the free passage of an article to be sprayed and its conveyor support along a conveyor transport path through one end wall, through one end wall, through said enclosure and out the other end wall;
   at least one powder recovery cart, said powder cart having first and second side walls, first and second end walls and a bottom coupled to define an open top receptacle for powder, said cart having wheels thereon and being rollable on said wheels under said spray booth enclosure in a direction substantially normal to said conveyor transport path from either side thereof so that said first and second end walls thereof are adjacent respective portions of said support structure, said cart having at least one cylindrical filter mounted therein with the axis of said filter being perpendicular to said first end wall thereof, said cart having a filter opening in said first card end wall in communication with the interior of said filter;
   said support structure including an exhaust blower having an air inlet in communication with a blower opening therein cooperatively disposed to be in communication with said filter opening in said cart when said cart is positioned beneath said spray booth enclosure; and
   sealing means for releasably sealing said filter opening and said blower opening.

2. The spray booth of claim 1 wherein said cylindrical filter is rotateable about its axis in said cart and further comprised of drive means accessible from one of said first and second ends of said cart for rotating said filter, said support structure including driver means engageable with said drive means when said cart is positioned under said enclosure, said driver means being a means for causing the rotation of said filter through said drive means.

3. The spray booth of claim 2 wherein said driver means is a means for periodically rotating said filter through a small angular increment in a predetermined direction.

4. The spray booth of claim 1 wherein said sealing means is a pneumatically controllable means.

5. The spray booth of claim 1 wherein said at least one cylindrical filter comprises a plurality of cartridge filters mounted coaxially in a single rotatable assembly.

6. The spray booth of claim 1 wherein said at least one cart also has a filter opening in said second cart end wall in communication with the interior of said filter, and said support structure includes two exhaust blowers, each having an air inlet in communication with a respective blower opening cooperatively disposed to be in communication with a respective said filter opening in said cart when said cart is positioned beneath said spray booth enclosure.

7. The spray booth of claim 1 wherein said at least one cart comprises a plurality of carts, whereby each of said carts may be rolled into and out of cooperative disposition with said enclosure.

8. The spray booth of claim 7 wherein said plurality of carts are coupled together in side by side relationship to form a powder cart magazine.

9. The spray booth of claim 8 wherein each of said carts contains powder of a different color to facilitate rapid color change.

10. The spray booth of claim 7 wherein at least one powder cart includes hinged cover means openable when said cart is positioned below said enclosure and closeable to prevent the entry of foreign matter into said receptacle when said cart is not in use.

11. The spray booth of claim 1 wherein said support structure is mounted on wheels so as to be moveable.

12. The spray booth of claim 11 wherein said wheels cooperatively engage floor mounted rails so as to be moveable in a predetermined path as defined by said rails.

13. The spray booth of claim 12 wherein said at least one cart comprises a plurality of carts, whereby each of said carts may be rolled into and out of cooperative disposition with said enclosure, said plurality of carts being coupled together in side by side relationship to form a powder cart magazine, said carts being mounted on wheels engaging floor mounted rails so as to be moveable in a predetermined path as defined by said rails.

* * * * *

UNITED STATES PATENT AND TRADEMARK OFFICE
CERTIFICATE OF CORRECTION

PATENT NO. : 4,545,324
DATED : October 8, 1985
INVENTOR(S) : Browning

It is certified that error appears in the above-identified patent and that said Letters Patent is hereby corrected as shown below:

| COLUMN | LINE | |
|---|---|---|
| 2 | 28 | Please delete "a" and insert --an--. |
| 4 | 13 | Please delete "passag" and insert --passage--. |
| 6 | 34 | Please delete "pin" and insert --pins--. |
| 6 | 59 | Please insert the word --a-- between the words "herein" and "new". |

Signed and Sealed this

Fourteenth Day of January 1986

[SEAL]

Attest:

Attesting Officer

DONALD J. QUIGG

Commissioner of Patents and Trademarks